United States Patent Office 3,219,691
Patented Nov. 23, 1965

3,219,691
PREPARATION OF NAPHTHALENE-2,6-
DICARBOXYLIC ACID
Edward J. McNelis, Wallingford, Pa., assignor to Sun Oil Company, Philadelphia, Pa., a corporation of New Jersey
No Drawing. Filed Mar. 23, 1962, Ser. No. 182,090
10 Claims. (Cl. 260—515)

This invention relates to procedures useful in the preparation of naphthalene-2,6-dicarboxylic acid from impure mixtures of naphthalene dicarboxylic acids obtained by partial oxidation of mixed dimethylnaphthalenes.

Naphthalene dicarboxylic acid in which the carboxyl groups are located at the 2,6-positions is a highly desirable article of commerce, particularly in that it can be used for making polyester type resins which have outstandingly good properties for certain applications. This dicarboxylic acid can be obtained by liquid phase oxidation of 2,6-dimethylnaphthalene in several ways. One known procedure involves the use of molecular oxygen (e.g., air) at temperatures in the range of 100–250° C. while utilizing a catalyst system comprising a heavy metal oxidation catalyst and bromine or a bromine compound. This type of oxidation process has been described in Saffer et al. United States Patent No. 2,833,816. By way of example, 2,6-dimethylnaphthalene can be converted to the corresponding diacid by contacting an acetic acid solution of the dimethylnaphthalene containing a cobalt acetate-ammonium bromide co-catalyst with molecular oxygen at a temperature in the range of 110–135° C.

A particularly suitable procedure for converting 2,6-dimethylnaphthalene to the corresponding naphthalene-2,6-dicarboxylic acid involves the use of nitrogen dioxide ($NO_2$) in combination with selenium. The procedure involves dissolving the 2,6-dimethylnaphthalene in an inert solvent such as trichlorobenzene, adding a small amount of selenium to the mixture and contacting the mixture in liquid phase with gaseous $NO_2$ at a temperature above 140° C., preferably in the range of 180–230° C. This procedure is capable of producing the 2,6-diacid in a yield generally in excess of 80% of the theoretical.

For commercial practice a difficulty in producing 2,6-naphthalene dicarboxylic acid by the foregoing oxidation routes lies in finding a suitable source of the 2,6-dimethylnaphthalene isomer. This compound occurs in coal tar and cracked petroleum fractions of appropriate boiling range but only in low proportion, since it is associated with the various other dimethylnaphthalene isomers, monocyclic aromatics and non-aromatic hydrocarbons. A concentrate of the dimethylnaphthalene isomers can be obtained by solvent extraction of the fraction with an aromatic-selective solvent such as furfural or by azeotropic distillation with diethylene glycol, but the 2,6-isomer is still only a minor constituent of the concentrate.

Mixed dimethylnaphthalenes obtained from cracked petroleum fractions or coal tar can be oxidized in the same manner as mentioned above for the 2,6-isomer to yield an impure mixture of the corresponding dicarboxylic acid isomers in which the 2,6-diacid is present typically in a concentration of only about 10%. A suitable means of increasing the yield of the 2,6-diacid is highly desirable.

It is known that the dipotassium, dirubidium or dicesium salt of a pure naphthalene dicarboxylic acid in which the carboxyl groups occur other than at the 2,6-positions can be converted to the 2,6-dicarboxylate by the so-called Henkel reaction. The procedure involves heating the naphthalene dicarboxylate to a temperature in the range of 350–530° C. in the presence of a catalyst which is a salt or oxide of cadmium, zinc or mercury and in a carbon dioxide atmosphere at a gauge pressure of 50–1500 p.s.i.g. This causes a shift in position of the carboxylate groups to the 2,6-positions. The rearrangement will occur regardless of whether the two carboxylate groups in the starting material are located on the same ring or on different rings of the naphthalene nucleus. The disalts of alkali metals other than potassium, rubidium and cesium do not appear to be capable of giving satisfactory yields of the 2,6-dicarboxylate by this procedure.

I have found, however, that if the starting material is the impure mixture of diacids obtained by liquid phase partial oxidation of mixed dimethylnaphthalenes by procedures such as discussed above, the Henkel reaction of the dipotassium, dirubidium or dicesium salts thereof will not proceed in the manner desired. Little, if any, of the 2,6-product will be produced from the other isomers.

I have now discovered that the mixed diacids obtained by partial oxidation of mixed dimethylnaphthalenes can, by a certain pretreatment, be converted into suitable starting material for effecting the Henkel reaction of their dipotassium, dirubidium or dicesium salts to produce the 2,6-product. The pretreatment involves converting the impure diacids to alkali metal disalts and adding a certain type of anti-solvent to an aqueous solution of the disalts to effect a selective precipitation. This pretreatment apparently removes, as a precipitate, impurities which inevitably are formed in the oxidation step and which somehow inhibit the Henkel reaction. It is not known with certainty just what these impurities are; but in any event it has been found that the dipotassium, dirubidium or dicesium salts of material which has been treated in the manner hereinafter described will readily undergo the Henkel reaction and give favorable yields of the 2,6-dicarboxylate.

According to the invention, the impure mixed naphthalene dicarboxylic acids obtained by the liquid phase partial oxidation of mixed dimethylnaphthalenes are converted to the corresponding disalts of any of the alkali metals, and an aqueous solution of the alkali metal disalts is prepared. Then an anti-solvent which is either acetone, methyl ethyl ketone or mixtures thereof is added to the aqueous solution to effect a precipitation and form an oily phase containing the undesirable components. The aqueous phase is separated from the oily phase and thereafter processed in any of several ways hereinafter described to obtain the desired charge material for the subsequent Henkel reaction.

The precipitation step effected by means of the ketone anti-solvent can conveniently be carried out at ambient temperature, although higher or lower temperatures are also suitable. The temperature should not be so low that a substantial amount of the impure disalts cannot be dissolved in the water nor so high as to require excessive amounts of the anti-solvent to effect precipitation of the undesirable components. Room temperature is preferred but the temperature generally can vary from above the freezing point of water to the boiling point of the ketone anti-solvent. The concentration of disalts in the solution prior to adding the acetone is not critical and can vary from say 1% by weight up to that equivalent to a saturated solution which at room temperature is of the order of 25% by weight. Generally it is preferred to use disalt concentrations in the range of 4–15%.

The amount of anti-solvent that should be added in the precipitation step will vary depending upon the concentration of disalts in the solution and the temperature used. In any event the amount of anti-solvent added should be sufficient to produce a substantial amount of the oily phase. The latter initially appears in the form of oil droplets which have a red color in cases where the crude dicarboxylic acids have been produced by means of the previously mentioned $NO_2$-selenium oxidation system. These droplets rapidly coalesce and settle out to form a red oily phase beneath the aqueous phase. The addition of anti-solvent preferably should be continued until a white precipitate just beings to form. The appearance of the white precipitate serves as an endpoint or in other words as a means of indicating that the maximum desired amount of anti-solvent has been added and that its addition accordingly should be stopped. When the amount of anti-solvent added is in excess of that required to reach this endpoint, the white precipitate can be seen as an accumulation in the water phase just above the oily phase when the mixture is allowed to stratify.

When the oily phase and aqueous phase are separately acidified, mixtures of naphthalene dicarboxylic acid isomers are obtained from each which mixtures are not strikingly different from each other as far as total diacid content and infrared spectra are concerned. The material derived from the oily layer does tend to have a darker color than the diacids obtained from the aqueous layer. For example, when the diacid charge mixture is obtained by the $NO_2$-selenium partial oxidation procedure, the diacids from the oily layer are brown whereas those from the aqueous layer are light tan. Also there is a difference in the proportions of the diacid isomers to each other in the two products. It has been found, for example, that the 2,6- and 2,7-isomers tend to concentrate in the oily phase and the 1,3- and 1,6-isomers in the aqueous phase, while substantially no selective concentration of the 1,7-isomer between the phases is exhibited. The total disalts in the aqueous phase generally amount to 70–90% of the disalt content of the charge to the precipitation step, with the remainder going to the oily phase.

The significant difference between the diacids derived from the separate phases is that those from the oily phase will not serve as suitable charge material for the Henkel reaction whereas those from the aqueous phase will.

Following the above-described precipitation step, several different procedures can be utilized for processing the purified material to obtain the charge for the Henkel reaction. One procedure involves distilling the anti-solvent from the aqueous phase and then acidifying the resulting aqueous solution with a mineral acid such as hydrochloric or sulfuric acid to recover the naphthalene dicarboxylic acids. Alternatively the aqueous phase can be acidified first to separate the diacids and the anti-solvent can be recovered from the water layer. After the purified diacids are obtained, they are converted by means of either potassium, rubidium or cesium hydroxide to the corresponding disalts. The latter are dried to obtain the charge material for the Henkel reaction.

A procedure which can be used in cases where the crude diacids were converted to either the potassium, rubidium or cesium disalts prior to the precipitation step involves merely evaporating the anti-solvent and water from the aqueous phase to obtain the dry salts. These can then be used directly in the Henkel reaction. In cases where the crude diacids were converted to alkali metal disalts other than the potassium, rubidium or cesium salts, the aqueous phase from the precipitation step can be subjected to an ion exchange reaction, either before or after removing the anti-solvent, by means of an ion exchanger adapted to replace the alkali metal ion with potassium, rubidium or cesium ions. For example, the aqueous phase can be passed through a bed of either potassium or cesium zeolite to effect the desired exchange of cations. The effluent water can then be evaporated from the salts to yield the potassium or cesium disalts for use in the Henkel reaction.

In carrying out the Henkel reaction step the dipotassium, dirubidium or dicesium salts are mixed with the catalyst and the mixture is heated to a temperature in the range of 350–530° C., more preferably 450–510° C., under an atmosphere of carbon dioxide at a pressure of 50–1500 p.s.i.g. and more preferably 100–300 p.s.i.g. The catalyst for the reaction can be any of the oxides or salts of cadmium, zinc or mercury. In the case of salts they can be derivatives of either organic or inorganic acids. The cadmium oxides or salts seem to be more effective than zinc or mercury compounds and are preferred. The following are examples of catalysts that can be used: cadmium sulfate, cadmium fluoride, cadmium acetate, cadmium benzoate, cadmium bromate, cadmium oxalate, and the corresponding zinc and mercury analogues. The amount of catalyst employed can vary widely but preferably is in the range of 2 to 10 moles per 100 moles of the disalts. The time that the reaction mixture is maintained within the temperature range of 350–530° C. can vary considerably, for example, from 0.1 to 5 hours. However, it is distinctly preferable merely to heat the mixture to the desired temperature level, which preferably is in the range of 456–510° C., and then allow it to cool immediately. This procedure has been found to minimize undesirable side reactions and result in higher yields of the 2,6-product than when the reaction temperature is maintained for a considerable time.

In addition to the desired 2,6-dicarboxylate product some naphthalene and other by-products are formed in the reaction. These can be removed from the reaction mixture by evaporation at elevated temperature, for example, by venting the system while the reaction mixture is still hot. The by-products can also be removed by extraction from the salts with a suitable solvent, e.g., benzene or ethyl ether. Preferably the reaction mixture is first admixed with water and the resulting disalt solution is extracted with such solvent. Carbonaceous material is also removed from the reaction products by filtering the disalt solution either before or after the extraction. The filtrate is then acidified by means of a mineral acid to convert the salt to naphthalene-2,6-dicarboxylic acid which forms as a precipitate and can be recovered by filtration. Generally minor amounts of other naphthalene dicarboxylic acids resulting from incomplete rearrangement in the Henkel reaction will be present in the 2,6-product. These other acids can be selectively removed from the desired product by washing it with methanol, since the 2,6-diacid has distinctly lower solubility in alcohol than the other isomers. When a high purity 2,6-product is desired, it may be desirable to carry out such washing step at elevated temperature to insure effective removal of the other isomers.

The following example is a specific illustration of the present process:

A concentrate of dimethylnaphthalenes, which had been obtained by azeotropic distillation of a catalytically cracked gas oil fraction with diethylene glycol, was used to prepare a crude mixture of naphthalene dicarboxylic acids by partial oxidation. The concentrate had approximately the following composition as determined by vapor phase chromatography:

| | Percent |
|---|---|
| 2-ethylnaphthalene | 4.0 |
| 1-ethylnaphthalene | 1.7 |
| 2,6-dimethylnaphthalene | 18.7 |
| 2,7-dimethylnaphthalene | 13.1 |
| 1,6-dimethylnaphthalene | 19.7 |
| 1,7-dimethylnaphthalene | 10.6 |
| 1,3-dimethylnaphthalene | 22.9 |
| 2,3-dimethylnaphthalene | 3.7 |
| 1,4-dimethylnaphthalene | 1.4 |
| 1,5-dimethylnaphthalene | 1.6 |
| 1,2-dimethylnaphthalene | 1.7 |
| Other | 0.9 |

This material was converted to the crude diacids by oxidizing it in a trichlorobenzene solvent by means of $NO_2$-selenium. The amount of selenium added to the reaction mixture was 5% by weight based on the alkylnaphthalene charged. Gaseous $NO_2$ was bubbled into the mixture while at a temperature of about 225° C. until the molar amount of $NO_2$ added was 50% in excess of the theoretical amount for converting all the dimethylnaphthalenes to naphthalene dicarboxylic acids. The reaction mixture was then washed successively with trichlorobenzene, pentane and water at room temperature to remove various impurities from the oxidation product. The resulting oxidation product had an acid number of 482 mg. KOH/g., indicating that it contained of the order of 85% diacids by weight. Analysis of the oxidation product indicated that the content of 2,6-diacid was roughly 23%.

A sample of the impure diacids was converted to their dipotassium salts which were then subjected to the Henkel reaction by heating a mixture of the salts with 10 mole percent of cadmium chloride in a bomb under an initial $CO_2$ pressure of 300 p.s.i.g. The mixture was heated to 475° C. and then allowed to cool. No significant increase in the 2,6-dipotassium salt content was obtained.

Another sample of the impure diacids was converted to the corresponding dipotassium salts. A 5% by weight solution of the salts in water was prepared and acetone was then added causing the precipitation of a red oil. When the volume of acetone added reached about three times that of the undiluted salt solution, precipitation of the red oil ceased and a white flocculent precipitate began to form, whereupon the addition of acetone was stopped. The red oil readily settled out as a bottom layer and was withdrawn. The oil was dissolved in water and the solution was filtered to remove a small amount of insoluble residue, which was found to contain 2.5% selenium. The filtrate containing most of the red oil layer was treated with hydrochloric acid to convert the contained salts to diacids. The aqueous phase from the precipitation step was distilled to remove acetone and the salt solution residue was then acidified to obtain the purified diacids. These amounted to roughly three times the amount of diacid material obtained from the oil layer.

A sample of the purified diacids obtained as described above was treated with KOH to convert the diacids to dipotassium salts and the dry salts were subjected to the Henkel reation under the same conditions as described above for the impure disalts. The reaction mixture was dissolved in water and the resulting salt solution was extracted with ethyl ether to remove naphthalene and any other components soluble therein. The aqueous phase was filtered to remove carbonaceous material, acidified with hydrochloric acid and then filtered. The resulting diacid cake was extracted with ethyl ether to remove a minor amount of material which was mainly the 2,6-diacid admixed with unidentified components. The acid filtrate contained material other than the 2,6-diacid which could be extracted therefrom with ethyl ether. The ether-washed diacids were then washed with methanol. This removed a minor amount of material that was mainly the 2,6-diacid along with a small amount of unidentified components. The resulting washed cake after drying was composed of the 2,6-diacid in a purity above 95% as indicated by infrared analysis. The yield of this product, based on theoretical if all of the diacid content of the charge material derived from the acetone precipitation step had been converted to the 2,6-diacid, was 56%. The calculated overall yield of 2,6-diacid including that in the ether and methanol washings from the diacid cake was of the order of 60–66%. This is about the same yield of 2,6-product that is obtainable when rigorously purified mixed naphthalene dicarboxylic acids are used as charge stock for the Henkel reaction.

The foregoing example illustrates the use of acetone as the anti-solvent for converting the crude mixed disalts into suitable charge material for the Henkel reaction. Substantially equivalent results are obtained when methyl ethyl ketone is used as the anti-solvent. Also the disalts from the precipitation step can be worked up prior to the Henkel reaction by any of the other procedures previously described. Even better results are obtained in the Henkel reaction when cesium is substituted for potassium.

I claim:

1. In the preparation of naphthalene 2,6-dicarboxylic acid from an impure mixture of naphthalene dicarboxylic acids prepared by liquid phase partial oxidation of mixed dimethylnaphthalenes at a temperature above 140° C. by means of $NO_2$ in the presence of selenium, the steps of converting the dicarboxylic acids in said impure mixture into alkali metal disalts, adding to an aqueous solution of the alkali metal disalts an anti-solvent selected from the group consisting of acetone and methyl ethyl ketone to form an oily phase and an aqueous phase containing purified alkali metal disalts, separating said phases from each other, recovering a purified mixture of dicarboxylic acids from the aqueous phase by converting the disalts to dicarboxylic acids by means of mineral acid, converting the dicarboxylic acids to alkali metal salts selected from the group consisting of dipotassium salts, dirubidium salts and dicesium salts, drying the disalts, heating the disalts in the presence of a catalyst selected from the group consisting of oxides and salts of cadmium, zinc and mercury to a temperature in the range of 350–530° C. and under a carbon dioxide pressure of 50–1500 p.s.i.g., to form the naphthalene-2,6-disalt, separating the resulting disalt from other reaction products, converting the naphthalene-2,6-disalt to the corresponding dicarboxylic acid by the addition thereto of a mineral acid, and recovering naphthalene-2,6-dicarboxylic acid from the disalt.

2. Method according to claim 1 wherein said temperature is in the range of 450–510° C.

3. Method according to claim 1 wherein said catalyst is a cadmium compound.

4. Method according to claim 1 wherein said anti-solvent is acetone.

5. Method according to claim 1 in which the amount of anti-solvent added to said aqueous solution is about that amount required to initiate the appearance of a white precipitate in addition to said oily phase.

6. In the preparation of naphthalene-2,6-dicarboxylic acid from an impure mixture of naphthalene dicarboxylic acids prepared by liquid phase partial oxidation of mixed dimethylnaphthalenes at a temperature above 140° C. by means of $NO_2$ in the presence of selenium, the steps of converting the dicarboxylic acids in said impure mixture to alkali metal disalts in which the alkali metal is selected from the group consisting of potassium, rubidium and cesium, adding to an aqueous solution of the alkali metal disalts an anti-solvent selected from the group consisting of acetone and methyl ethyl ketone to form an oily phase and an aqueous phase containing purified alkali metal disalts, separating said phases from each other, removing anti-solvent and water from the aqueous phase to obtain dry alkali metal disalts, and heating the dry disalts in the presence of a catalyst selected from the group consisting of oxides and salts of cadmium, zinc and mercury to a temperature in the range of 350–530° C. and under a carbon dioxide pressure of 50–1500 p.s.i.g., whereby the disalt of naphthalene-2,6-dicarboxylic acid is formed.

7. Method according to claim 6 wherein said temperature is in the range of 450–510° C.

8. Method according to claim 6 wherein said catalyst is a cadmium compound.

9. Method according to claim 6 wherein said anti-solvent is acetone.

10. Method according to claim 6 in which the amount of anti-solvent added to said aqueous solution is about that amount required to initiate the appearance of a white precipitate in addition to said oily phase.

References Cited by the Examiner

UNITED STATES PATENTS

| | | | |
|---|---|---|---|
| 1,332,028 | 2/1920 | Coblentz et al. | 260—524 |
| 2,840,604 | 6/1958 | Feighner et al. | 260—525 |
| 2,849,482 | 8/1958 | Raecke et al. | 260—525 X |
| 2,905,709 | 9/1959 | Schenk et al. | 260—525 X |
| 2,927,130 | 3/1960 | Schutt | 260—525 |
| 2,930,813 | 3/1960 | Schenk et al. | 260—525 X |
| 2,952,704 | 9/1960 | Hetzel | 260—525 |
| 2,966,513 | 12/1960 | Fields | 260—524 |

FOREIGN PATENTS

| | | |
|---|---|---|
| 786,897 | 11/1957 | Great Britain. |
| 823,437 | 11/1959 | Great Britain. |
| 825,375 | 12/1959 | Great Britain. |

LORRAINE A. WEINBERGER, *Primary Examiner.*

LEON ZITVER, *Examiner.*